Dec. 13, 1949     E. E. THEIS     2,491,230
PUMP

Filed April 11, 1946     2 Sheets-Sheet 2

INVENTOR.
Elmer E. Theis
BY
Wood, Arey, Herron & Evans
ATTORNEYS

Patented Dec. 13, 1949

2,491,230

UNITED STATES PATENT OFFICE 2,491,230

PUMP

Elmer E. Theis, Memphis, Tenn.

Application April 11, 1946, Serial No. 661,406

1 Claim. (Cl. 103—150)

This invention relates to an improved pump which is adapted particularly to be used in domestic or small industrial water supply systems, but which is also suited for use in pumping other types of liquids.

The principal objective of the invention has been to provide a pump of simple mechanical structure which can be manufactured readily on a production basis at low cost and which will provide trouble-free service for prolonged periods of usage. The invention particularly contemplates a pump so constructed as not to be deteriorated in the pumping of water containing sand or grit, and will not require continual lubrication or maintenance attention.

Briefly, the pump of this invention by which the desired advantages are obtained comprises a casing or body having pumping heads at its opposite ends which are spanned by diaphragms. The heads respectively contain appropriate inlet and outlet valves and the diaphragms, moved inwardly or outwardly with respect to the heads, cause a pumping action or a suction action to take place therein. The diaphragms are interconnected with one another so as to be operable in unison by a pitman member which is oscillated by an eccentric portion of a drive shaft extending into the casing intermediate the heads.

In the preferred structure the bottom of the casing is configurated to contain inlet and outlet passageways or conduits respectively communicating with the pumping heads. The conduits contain inlet and outlet apertures respectively adapted to be connected with the inlet and the outlet delivery pipes through which the fluid to be pumped is passed.

One of the principal features of the invention resides in a simple drive connection by means of which the diaphragms are oscillated in unison by the pitman member. In the past the various types of anti-friction bearings have been used for the purpose, and these have operated quite satisfactorily when lubrication conditions were favorable. However, in the past devices, the inner race of the anti-friction bearing has been fastened to the eccentric driving member while the outer race is fitted snugly in the pitman or connecting rod. The outer race, however, always has been subjected to sliding motion which is necessary in the conversion of rotary motion to linear motion. Under such conditions wear occurs at the points where the sliding action on the outer race takes place, and this year becomes very acute under difficult or adverse service conditions, for instance, in out-of-doors pump service where the parts are exposed to dust, dirt and grit. For this reason it has been conventional either to provide various types of take-up devices which are adjusted from time to time to keep the parts in snug-fitting relationship to one another, or to use spring-actuated followers which continue to operate until the parts are worn out; wear to such extent may and frequently does occur in only a few years of operation.

In accordance with the present invention a construction is employed which is somewhat similar, visually, to the type heretofore utilized but in this invention a free fit is established between the outer race of the anti-friction bearing and the pitman within which it operates; that is, the opposed surfaces of the yoke in the pitman are spaced apart a distance which is slightly greater than the diameter of the outer race of the bearings whereby the outer race of the bearing rolls in respect to the yoke and all sliding action is eliminated. Thus, as the eccentric is moving relatively upwardly and arcuately, it urges the outer surface at one side of the anti-friction bearing toward and into contact with one surface of the yoke. After this initial contact the outer race rolls over the yoke surface, while the bearing, as a whole, is moving upwardly. Conversely, when the eccentric swings downwardly and arcuately toward the other side of the yoke to push the pitman in the opposite direction, an opposite point on the outer race of the bearing engages the opposed surface of the yoke and the outer race of the bearing rolls against this yoke surface. The direction of rotation of the outer race, as caused by this stepwise rolling, actually is counter to the direction of rotation of the eccentric drive shaft but this makes no difference since, while the outer race is rolling on one yoke surface, it clears the other yoke surface. At no time is one part sliding against another.

While it is logical to assume that the provision of free "play," for instance, five to ten thousandths of an inch, between the outer race and its co-operating yoke surfaces, would permit a bumping or knocking sound to be produced upon engagement of the bearing with the yoke surfaces during back and forth movement thereof, still it has been found in actual practice that this undesirable result is not encountered. Perhaps the explanation resides in the fact that the approach of the bearing to the yoke surfaces is gradual despite the relatively high speed of rotation, and that the diaphragm construction provides a resilence which eliminates noise. At any rate the pump runs quietly even after long periods of usage.

From the manufacturing point of view the construction is desirable because it enables the pitman, including the yoke portion thereof, to be fabricated in the form of a simple casting, of aluminum for example, whereby the light weight of the moving parts reduces inertia. Inasmuch as aluminum is malleable the yoke surfaces over a period of time might become deformed through the repeated rolling pressure engagement by the hardened outer raceway of the anti-friction bearing. To avoid deformation of the metal, hardened metal inserts are provided at the yoke for engagement with the outer race of the bearing. These are not "wear" strips in the usual sense because they are not subjected to any sliding action. However, they do prevent displacement or compaction of the relatively ductile material of which the remainder of the connecting rod is fabricated. If harder material is used in the fabrication of the connecting rod the strips may be omitted and the desired action may be obtained by co-operation between the outer bearing race and a bore of suitable size in the yoke.

A typical embodiment of a pump constructed in accordance with the invention is shown in the accompanying drawings which are described in detail in the specification which follows.

In the drawings:

Figure 3 is a sectional view through the valves and conduits, taken on the line 3—3 of Figure 1.

Figure 1:
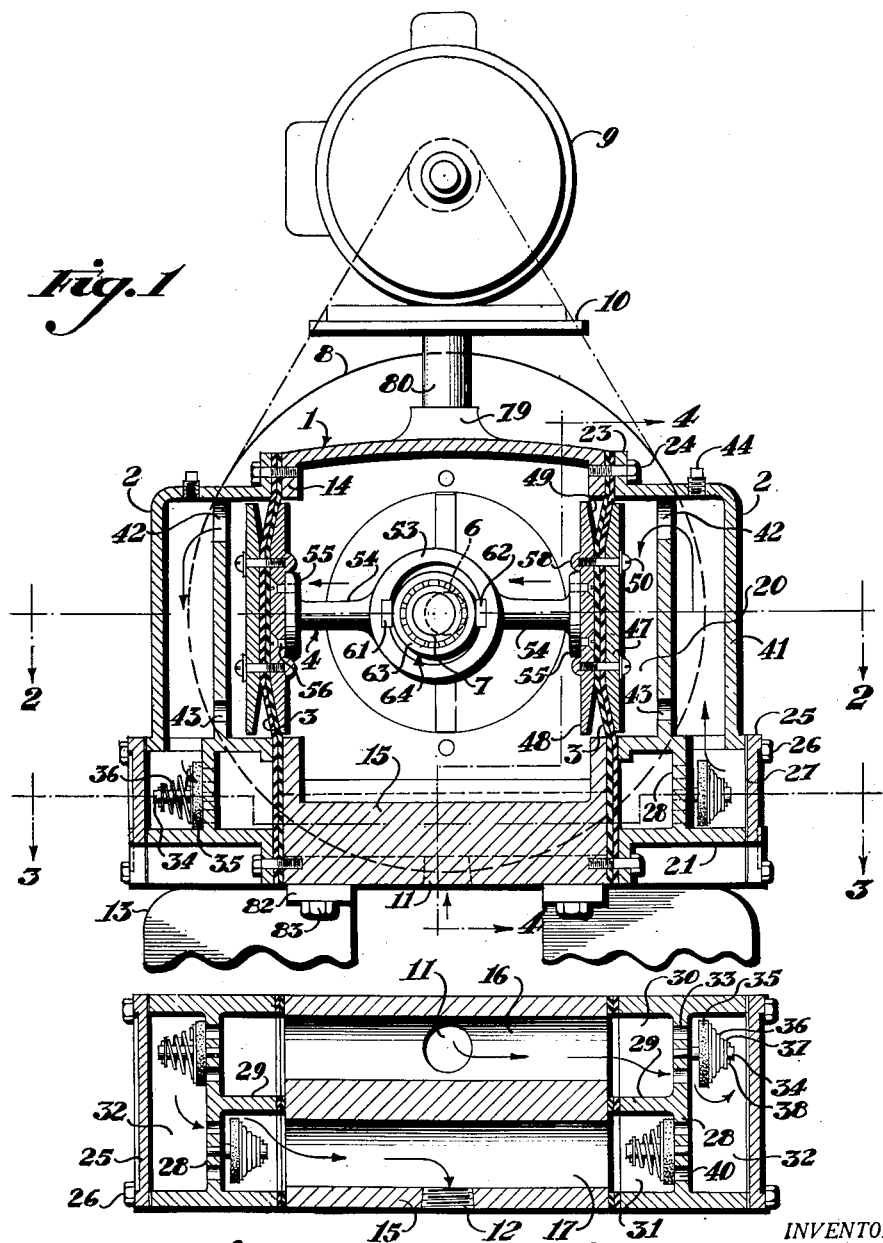
Figure 1 is a longitudinal sectional view through the pump.

The pump shown in the drawings comprises a casing indicated generally at 1, pump heads 2—2 which respectively are located at the opposite ends of the casing, pump diaphragms 3—3 disposed intermediate the ends of the casing and the pump heads, a pitman or connecting rod 4 having its opposite ends in connection with the diaphragms 3, and a drive assembly indicated generally at 5, including a drive shaft 6 containing an eccentric portion 7 which is in driving connection with the yoke portion of the connecting rod 4. The drive shaft carries a pulley 8 which is rotated, by means of a belt, from a motor 9 mounted on a pedestal 10 supported by the casing. The inlet to the pump is a tapped opening 11 at the bottom of the casing and the outlet of the pump is a tapped opening 12. The casing is provided with feet 13 which hold the pump in a slightly elevated position above the floor level for convenience in connecting a suction pipe with the inlet 11.

*Pump casing and heads*

The casing is a hollow, somewhat cylindrical member having annular flanges 14 turned inwardly at the opposite ends thereof and it includes a longitudinal rib 15, at its lower portion, which extends throughout its length. This rib contains coextensive passageways 16 and 17, respectively communicating with the inlet opening 11 and the outlet opening 12. At one side of the casing an annular boss 18 is provided on an axis intersecting the longitudinal axis of the casing, and this boss terminates in a face 19 which forms the seat for the drive assembly 5.

The casing preferably is in the form of a simple casting with the conduits 16 and 17 being appropriately cored so that the only machinery required, aside from the drilling and tapping of bolt holes, is the facing of the boss 18, the facing of the end flanges 14, and contiguous faces of the ends of the rib 15.

The pump heads 2 are similar to one another and are located at the opposite faced ends of the casing 1. Each head includes a cup-shaped compartment 20 which forms a cavity extending beyond the annular flanges 14 and a valve box portion 21 which forms a continuation of the longitudinal rib 15. The heads preferably are made in the form of castings conforming substantially to the contour of the casing at the ends thereof and each has a peripheral flange 23 which is bored to receive bolts 24 threaded into tapped openings in the casing, or rib thereof. The valve box portion of each pump head is open at both ends but the outer open end is closed by means of a removable plate 25 which is held in place through bolts 26, the bolts passing into threaded bores in the valve box proper. A gasket 27 is interposed between the removable plate 25 and the valve box to form a liquid-tight seal.

Each valve box has a transverse wall 28 extending across it, and also a longitudinal dividing wall 29 extending from the transverse wall toward the rib 15 so as to maintain the line of separation between the outlet and inlet passageways 16 and 17. By these partitions the valve box is divided into an inlet compartment 30, communicating with the inlet passageway 16, an outlet compartment 31 communicating with the outlet passageway 17, and a chamber 32 at the opposite side of the transverse wall 28, this chamber being common to both the inlet and outlet passageways.

The inlet and outlet valves may be of conventional design and are oppositely arranged in respect to one another to cooperate in the usual manner. In the structure shown, transverse wall 28 has a plurality of bores 33 forming an inlet passageway surrounding the inlet valve stud 34 which projects laterally from the transverse wall into the compartment 32. This stud carries a valve disc 35 which is urged toward the surface of wall 28 by means of a conical spring 36. The spring bears upon a washer 37 which is retained by means of a cotter pin 38 passing through the valve stud adjacent the extremity thereof. Thus, valve disc 35 seats against the wall 28 to close the passageway provided by bores 33, and opens against the spring pressure under suction influence. The outlet valve of each head is located in the compartment 31 thereof, this valve co-operating with a plurality of bores 40 which are disposed laterally around the valve stud within the area embraced by the outlet valve disc. Of the two valves the inlet is the one most likely to be cut or impaired by the presence of grit or sand in the water being pumped. However, this valve is readily accessible through removal of the end plate 25 and, when the end plate is removed, any collected sedimentation readily may be removed from the valve chambers.

Each head casting also includes a conduit 41 which extends upwardly along the wall which defines the cup or recess 20. At its lower end the conduit 41 communicates with the common chamber 32 of the valve box and at its upper end, the conduit communicates with the recess 20 through a passageway 42. However, another opening 43 is located to admit liquid from the recess 20 to the conduit 41 at a point just above the valve box. It has been found that the provision of these two passageways, one of substantial size near the top and one of small size near the bottom of the recess 20, prevents inefficient pumping action which otherwise might be caused through accumulations of air in the pump compartment and also makes the pump operate more quietly. The upper end of the conduit 41 contains a plug 44 which may be removed to vent air or to facilitate priming if necessary.

The diaphragms 3 through which the pumping action is obtained are disposed respectively between the ends of the casing 1 and the pumping heads which are attached thereto. Each diaphragm, in the preferred embodiment of the invention comprises two sheet-like pieces of rubber or synthetic rubber, preferably Neoprene, approximately one-fourth inch thick more or less. These plies reside in facial engagement with one another. It is to be noted that these diaphragms conform to the contour of the pump heads and casing, and extend downwardly over the ribbed portion 15 of the casing where the diaphragms contain appropriate apertures in alignment with the conduits 16 and 17. The diaphragms therefore not only serve the functional pumping action, but the arrangement also eliminates the need for extra gaskets since the diaphragms, being elastic, serve that purpose. The throw of the eccentric may be such that the diaphragms do not move in a horizontal direction more than one-half their thickness beyond their vertical center lines.

If desirable, the diaphragms may be made up of three or more plies. The two-ply structure which is shown in the drawings has been found to perform satisfactorily in pumps for domestic water supply systems and the like.

The portion of each diaphragm which spans the recess 20 is embraced respectively at the opposite sides thereof by disc members 27 and 48. These discs are circular pieces less in diameter approximately by the thickness of the diaphragm than the diameter of the recess 20; thus the peripheries of the discs are spaced uniformly from the inner surfaces of the recesses approximately one-half the diaphragm thickness, whereby the total reciprocating assembly floats on the diaphragms thus eliminating the need for a cross head guide and its lubrication. This arrangement also results in quietness of operation of the unit.

The inward faces of the discs, that is, the faces residing in engagement with the diaphragm, are chamfered outwardly for approximately two-fifths of the outer position of the radius of the discs as at 49, so that the peripheral edges of the discs do not tend to bite or cut into the diaphragm material. Plates 47 and 48 are fixed to the diaphragm at the opposite sides thereof by means of screws 50 which pass through one plate, through the diaphragm, and into threaded bores in the other plate.

Pump drive

The outer plates 48, which are facing one another at the opposite ends of the casing, are connected respectively to the opposite ends of the pitman or connecting rod member 4. In the preferred structure, the connecting rod comprises a central yoke portion 53 having aligned rods 54—54 extending outwardly therefrom in opposite directions. These rod portions terminate in flanges 55 and the flanges reside respectively in facial engagement with the plates 48. Bevel headed screws 56 extend through the plate 48 into threaded bores in the flanges 55 to fasten the two together.

It is to be noted that each pair of plates 47 and 48, at the opposite sides of each diaphragm, are held against the diaphragm by the radially spaced screws 50. To avoid the weakening of the drive plates 48 at the central areas thereof through these double rows of screw holes, each drive plate contains an annular ridge 58 at its exposed surface, the diameter of the annular ridge being such that the flange 55 just fits within it.

Figure 2:
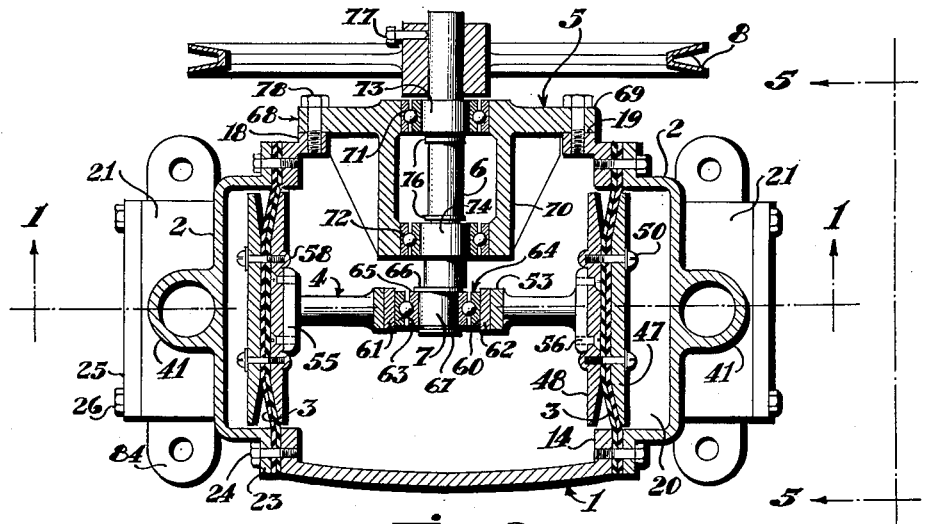
Figure 2 is a cross sectional view taken on the line 2—2 of Figure 1.
Figures 4, 5:
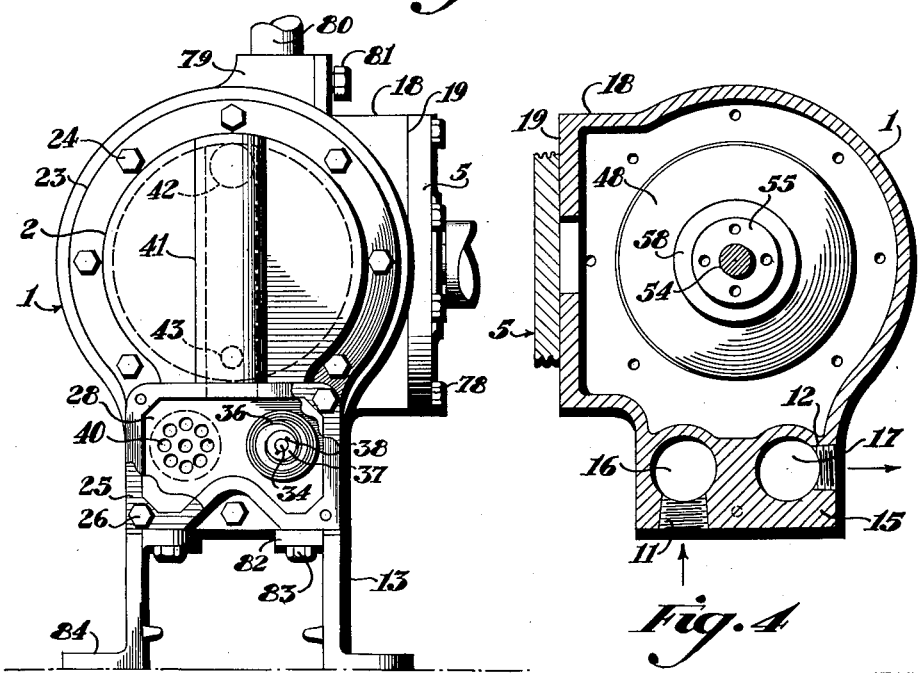
Figure 4 is a sectional view taken on the line 4—4 of Figure 1.
Figure 5 is an end elevation of the pump as viewed from the line 5—5 of Figure 2.

The interconnection between the eccentric 7 of the drive shaft 6 and the yoke 53 of the connecting rod 4 is shown best in Figures 1 and 2. Yoke portion 53 has a transverse bore 60 and hardened shoes 61 and 62 are located within this bore opposite one another and in alignment with the rod portions 54 of the connecting rod, the inner faces of the shoes 61 and 62 projecting inwardly beyond the contour of bore 60. These shoes respectively engage opposite sides of the outer race 63 of an anti-friction bearing indicated generally at 64. The inner race 65 of the anti-friction bearing is engaged by eccentric 7 which carries a washer 66 at one side of the inner race of the bearing, and a snap ring 67 at the opposite side of the inner race of the bearing to prevent axial movement of the eccentric. As previously described, the faces of the shoes 61 and 62 are spaced apart from one another a distance which is slightly greater than the diameter of the outer race of the bearing; preferably, the clearance is about three to ten thousandths of an inch.

Figure 1 shows the connecting rod in a position where it has just completed a pumping stroke to the left and is just about to begin a pumping stroke to the right. At this time, presuming that the direction of rotation of the drive shaft 6 is as indicated by the arrow in Figure 1, it will be seen that the eccentric 7 relatively is moving in an arcuate direction upwardly and to the right. This movement will cause the outer race of the bearing to engage shoe 62. At the time the bearing will clear the shoe 61 by virtue of the clearance that has been provided. As the eccentric moves upwardly and to the right it is apparent that the outer race of the bearing will roll relatively in an upward direction over the surface of the shoe 62 and this rolling action will continue as long as the eccentric is moving the bearing relatively to the right. A similar result will be obtained as the eccentric starts to move downwardly and to the left, at which time the opposite point upon the bearing will engage shoe 61, and shoe 62 will then be disengaged. Thus, no sliding motion has taken place at any time, only rolling motion, in which wear is minimized.

The drive assembly 5, as shown in Figure 2, simplifies manufacturing and production problems in that it comprises a separate casting 68 which includes a flange 69 and a hub 70 extending inwardly from the flange portion, the two portions being reenforced by means of suitable ribs, and the assembly is adapted to be mounted as a unit on the casing 1. The hub 70 is bored to receive anti-friction bearings 71 and 72 which are spaced apart from one another at the hub extremities. Drive shaft 6 has portions 73 and 74 of enlarged diameter fitted to the inner races of the anti-friction bearings while the intermediate portion of the shaft is of reduced diameter and carries snap rings 76 to prevent the axial shaft movement. Drive shaft 6 projects outwardly beyond the flange 69 to carry a pulley 8 which is fixed by means of a set screw 77.

This unitary assembly is mounted to the pump casing by means of bolts 78 which pass through the flange 69 into threaded engagement with bores located in the face of the boss 18.

The casing, at its upper central portion, is provided with a boss 79 having a post 80 extending upwardly therefrom and is held in place by means of a set screw 81. A pedestal 10 is welded or otherwise suitably fastened to the upper end of post 80 to form the mounting for motor 9. Thus, the post conveniently may be raised or lowered, to tighten or to loosen the motor belt by means of which the pulley 8 is driven from the motor.

Legs 13 of the pump may be in the form of plates having ears 82 bent inwardly and fastened to the bottom of the rib 15, as by means of bolts 83; the lower ends of the legs are provided with feet 84 bent outwardly and suitably bored to facilitate attachment of the pump to the floor.

It is to be noted that there is no downward drag or thrust upon the diaphragms of the pump inasmuch as the connecting rod is balanced both statically and dynamically and has no tendency to move in longitudinal directions central and square with respect to the diaphragms. In other words, the connecting rod 4 "floats" intermediate the diaphragms. It also will be noted that the casing, the two head members, and the drive assembly all embody simple castings which are fitted together with a minimum number of machined surfaces.

Having described my invention, I claim:

A pump comprising a substantially cylindrical casing having a boss presenting a facial surface intermediate its ends, a member fastened to said facial surface of said boss and having bearings for supporting a shaft extending transversely of said casing, pump heads fastened to said casing at opposite ends thereof, diaphragms secured to said casing by said pump heads, means for actuating said diaphragms in unison including a shaft rotatably journalled in said bearings on an axis transverse to the longitudinal axis of said casing, said shaft presenting an eccentric disposed within said casing, an anti-friction bearing carried by said eccentric, a connecting rod having its endwise portions respectively connected with and solely supported by said diaphragms and having a yoke at its central portion, shoes disposed within said yoke in spaced relationship to one another on the longitudinal axis of said connecting rod, said antifriction bearing having its outer race disposed within said yoke between said shoes, the diameter of the outer race of said bearing being to the order of three to ten thousandths of an inch less than the spacing between said shoes, each of said diaphragms being embraced on opposite sides thereof by a pair of discs having a diameter less than the internal diameter of the pump heads by the thickness of the diaphragms, the inner faces of the discs being flat in their central portions and being outwardly chamfered for approximately $2/3$ of the outer portion of the radius of the discs, the inner discs each being attached to the ends of the connecting rod and the outer discs cooperating with the inner discs to clamp the diaphragms therebetween, fluid conduits extending along said pump heads at the side thereof opposite said diaphragms, inlet and outlet valves at the bottom of said fluid conduits, and passageways extending from said pump heads to said fluid conduits, one of said passageways being of substantial size and located at the top of said fluid conduits and the other of said passageways being of smaller size and located at the bottom of said conduits but above said inlet and outlet valves.

ELMER E. THEIS.

REFERENCES CITED

The following references are of record in the file of this patent:

UNITED STATES PATENTS

| Number | Name | Date |
|--------|------|------|
| 781,678 | Richwood | Feb. 7, 1905 |
| 2,083,073 | Loeber | June 8, 1937 |
| 2,171,209 | Folsom | Aug. 29, 1939 |

FOREIGN PATENTS

| Number | Country | Date |
|--------|---------|------|
| 463,671 | Great Britain | 1937 |